United States Patent [19]
Kobayashi et al.

[11] Patent Number: 5,461,537
[45] Date of Patent: Oct. 24, 1995

[54] SOLID ELECTROLYTIC CAPACITOR AND METHOD OF MANUFACTURING THE SAME

[75] Inventors: Atsushi Kobayashi; Takashi Fukaumi, both of Tokyo, Japan

[73] Assignee: NEC Corporation, Tokyo, Japan

[21] Appl. No.: 280,853

[22] Filed: Jul. 26, 1994

[30] Foreign Application Priority Data

Jul. 29, 1993 [JP] Japan ................... 5-187808

[51] Int. Cl.[6] .................................................. H01G 9/025
[52] U.S. Cl. ................................ 361/525; 29/25.03
[58] Field of Search ........................ 361/523–525, 361/528, 529; 29/25.03; 427/80; 252/500, 511

[56] References Cited

U.S. PATENT DOCUMENTS 4,780,796  10/1988  Fukuda ......................... 361/525

FOREIGN PATENT DOCUMENTS

| | | |
|---|---|---|
| 1-36012 | 2/1989 | Japan . |
| 1-32619 | 2/1989 | Japan . |
| 1-74712 | 3/1989 | Japan . |
| 1-225110 | 9/1989 | Japan . |
| 2-117121 | 5/1990 | Japan . |
| 3-35516 | 2/1991 | Japan . |
| 3-64013 | 3/1991 | Japan . |
| 3183111 | 8/1991 | Japan ................... 361/525 |

*Primary Examiner*—Kristine L. Kincaid
*Assistant Examiner*—Michael D. Switzer
*Attorney, Agent, or Firm*—Popham, Haik, Schnobrich & Kaufman, Ltd.

[57] ABSTRACT

A solid electrolytic capacitor includes an anode, a dielectric layer, two conductive polymer compound layers, and a cathode electrode. The anode consists of a valve metal and has a lead extending therefrom. The dielectric layer is formed by oxidizing a surface of the anode. The two conductive polymer compound layers are formed on the dielectric layer and respectively consist of solid electrolytes, at least one of the two conductive polymer compound layers consisting of a conductive polymer compound chemically oxidized and polymerized using an oxidant. The cathode electrode is formed on the two conductive polymer compound layers. A method of manufacturing this capacitor is also disclosed.

9 Claims, 2 Drawing Sheets

SOLID ELECTROLYTIC CAPACITOR AND METHOD OF MANUFACTURING THE SAME

BACKGROUND OF THE INVENTION

The present invention relates to a solid electrolytic capacitor using a conductive polymer compound as a solid electrolyte and a method of manufacturing the same and, more particularly, to a solid electrolytic capacitor having a high capacitance reproduction ratio and excellent in frequency characteristics and heat resistance, and a method of manufacturing the same.

Compactness and high reliability of electronic devices have been demanded along with developments of scientific techniques. Demand has arisen for a highly reliable large-capacitance solid electrolytic capacitor excellent in characteristics up to a high-frequency range. To meet this demand, extensive research and development have been made.

A general solid electrolytic capacitor has a structure in which a molded porous body of a valve metal such as tantalum or aluminum serves as a first electrode (anode), an oxide coating of this metal serves as a dielectric, and a solid electrolyte such as manganese dioxide ($MnO_2$) or a 7,7',8,8'-tetracyanodimethane (TCNQ) complex salt serves as part of a second electrode (cathode). In this case, the solid electrolyte must have a function of electrically connecting electrode leads to the entire surface of the dielectric inside the molded porous body and a function of repairing short-circuiting caused by a dielectric coating defect. As a result, a metal having a high electrical conductivity but having no dielectric repair function cannot be used as a solid electrolyte. Manganese dioxide or the like subjected to transition into an insulator due to heat caused by a short-circuiting current has been used. However, when manganese dioxide is used as part of an electrode, the impedance cannot be decreased in a high-frequency range because manganese dioxide does not have a sufficiently high electrical conductivity. When the TCNQ complex salt is used as part of an electrode, the TCNQ complex salt tends to be thermally decomposed, resulting in a low heat resistance.

In recent years, new materials have been developed in the field of polymers. A conductive polymer obtained by adding (doping) an electron donor or acceptor compound (dopant) to a conjugated polymer such as polyacetylene, polyparaphenylene, polypyrrole, or polyaniline. A 5-membered heterocyclic compound (e.g., polypyrrole or polythiophene) or polyaniline can be electrolytically polymerized to easily obtain a conductive polymer and is used as the electrolyte of a capacitor (Japanese Patent Laid-Open No. 64-36012 as Reference 1 and Japanese Patent Laid-Open No. 3-64013 as Reference 2). According to this method, however, electrolytic polymerization is performed on an insulating oxide coating to make it very difficult to form a uniform conductive polymer film. For this reason, a method of forming a conductive polymer electrolytically polymerized on an oxide coating with a conductive precoat film is popularly used (Japanese Patent Laid-Open Nos. 64-32619, 64-74712, 1-225110, and 2-117121, and References 1 and 2). In this method, however, an auxiliary electrode for electrolytic polymerization must be located near a capacitor element, resulting in poor mass production.

There is also proposed a method of applying and drying a conductive polymer soluble in an organic solvent to obtain a solid electrolyte. For example, a polyaniline solution obtained in advance by a method of polymerizing aniline is applied to and dried on the surface of a metal oxide coating, and the dried polyaniline coating serves as a solid electrolyte, thereby proposing a solid electrolytic capacitor (Japanese Patent Laid-Open No. 3-35516). According to this method, however, the polyaniline solution has a very high viscosity and cannot be permeated into the entire fine oxide coating having a large area. For this reason, only a capacitor having a very low capacitance reproduction ratio (i.e., a ratio of an actual electrostatic capacitance value to a design value) can be produced. To the contrary, there is also proposed a method of polymerizing an aniline monomer on an oxide coating to form polyaniline. In this case, although a sufficiently high capacitance reproduction ratio can be obtained, the capacitor characteristics in the high-frequency range are poorer than that of a capacitor using polypyrrole because polyaniline itself has a lower electrical conductivity than that of polypyrrole.

SUMMARY OF THE INVENTION

It is an object of the present invention to provide a solid electrolytic capacitor having a very large area and a high capacitance reproduction ratio and excellent in characteristics up to a high-frequency range, and a method of manufacturing the same.

It is another object of the present invention to provide a solid electrolytic capacitor having a high heat resistance and a method of manufacturing the same.

In order to achieve the above objects of the present invention, there is provided a solid electrolytic capacitor comprising an anode consisting of a valve metal and having a lead extending therefrom, a dielectric layer formed by oxidizing a surface of the anode, two conductive polymer compound layers formed on the dielectric layer and respectively consisting of solid electrolytes, at least one of the two conductive polymer compound layers consisting of a conductive polymer compound chemically oxidized and polymerized using an oxidant, and a cathode electrode formed on the two conductive polymer compound layers.

DETAILED DESCRIPTION OF THE PREFERRED EMBODIMENT

An embodiment of the present invention will be described below.

Figure 1A:
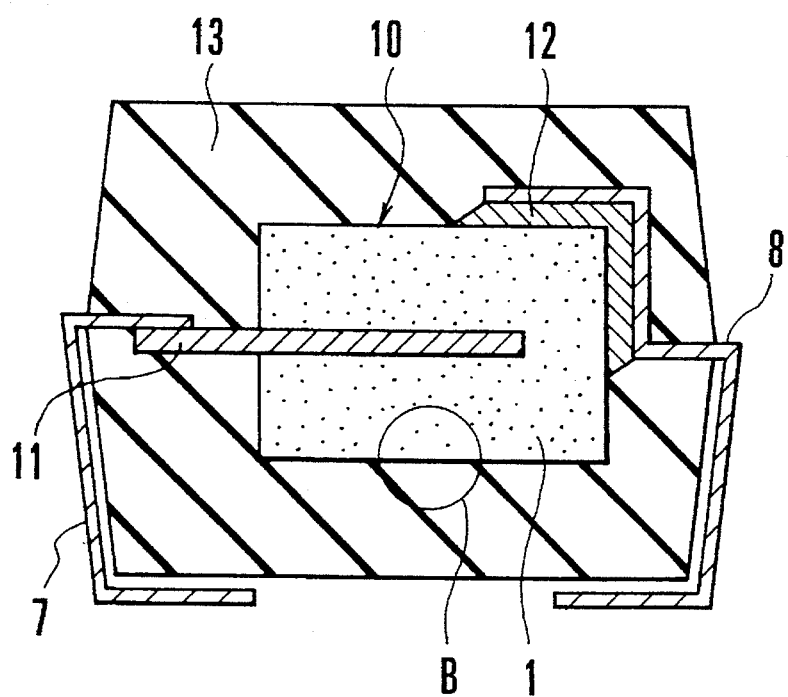
FIG. 1A is a sectional view showing a solid electrolytic capacitor and a method of manufacturing the same according to an embodiment of the present invention.
Figure 1B:
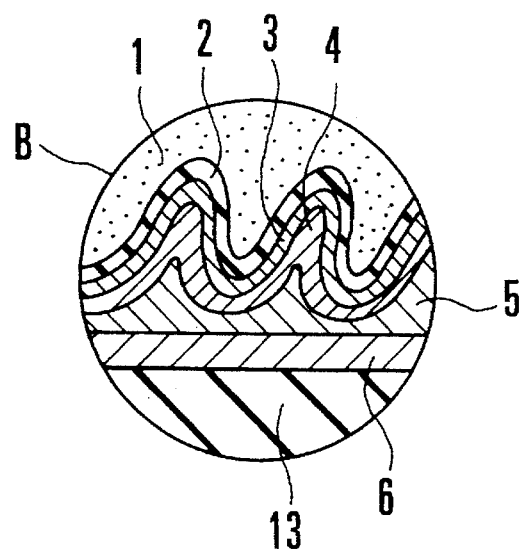
FIG. 1B is an enlarged sectional view showing the main part of the solid electrolytic capacitor shown in FIG. 1A.

FIG. 1A shows a solid electrolytic capacitor according to an embodiment of the present invention, and FIG. 1B shows the main part of the solid electrolytic capacitor shown in FIG. 1A. Referring to FIG. 1A, reference numeral 10 denotes a chip type capacitor element including an anode 1. One end of an anode lead 7 is welded to a lead 11 externally extending from the capacitor element 10. At the same time, one end of a cathode lead 8 is fixed to the surface of the capacitor element 10 with a conductive adhesive 12. Finally, the capacitor element 10 is molded with a molding resin 13.

FIG. 1B shows a surface portion B of the capacitor 10 in FIG. 1A. The surface of the anode 1 consisting of a valve metal constituting the capacitor element 10 has a very large area. That is, the surface of the anode 1 has a very large surface area. A dielectric 2 consisting of a metal oxide is formed along a porous wall surface of the anode 1. Two conductive polymer compound layers 3 and 4 consisting of solid electrolytes serving as the subject matter of the present invention are sequentially formed on the surface of the dielectric 2 so as to fill the layers 3 and 4 deep inside the pores of the dielectric 2. A cathode electrode 6 is formed on the conductive polymer compound layer on the side opposite to the dielectric 2. A graphite layer 5 may be formed between the cathode electrode 6 and the conductive polymer compound layer 4 to obtain good electrical contact. That is, the cathode electrode 6 is formed on the outer surface of the capacitor element 10, and the cathode lead 8 is electrically connected to part of the cathode electrode 6 through the conductive adhesive 12.

The present invention will be described in detail with reference to the views for explaining the steps in manufacturing this capacitor in FIGS. 2A to 2C. However, the present invention is not limited to this example.

Example 1 will be described below.

Figure 2A:
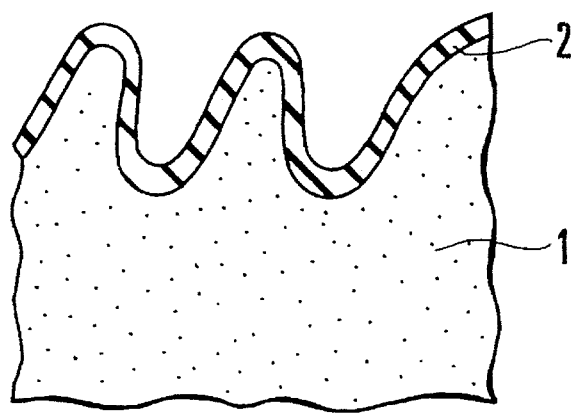
FIGS. 2A to 2C are sectional views showing the steps in manufacturing the solid electrolytic capacitor according to the present invention.
Figure 2B:
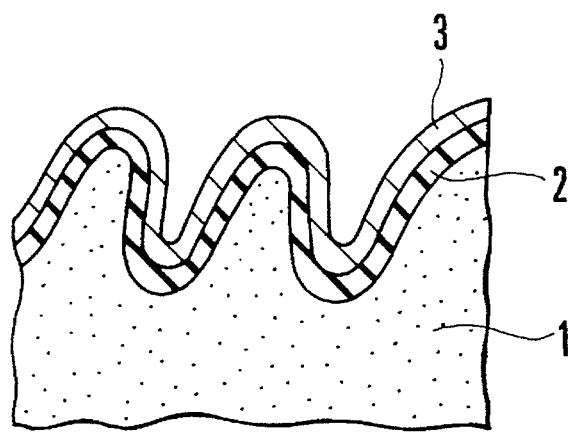
Figure 2C:
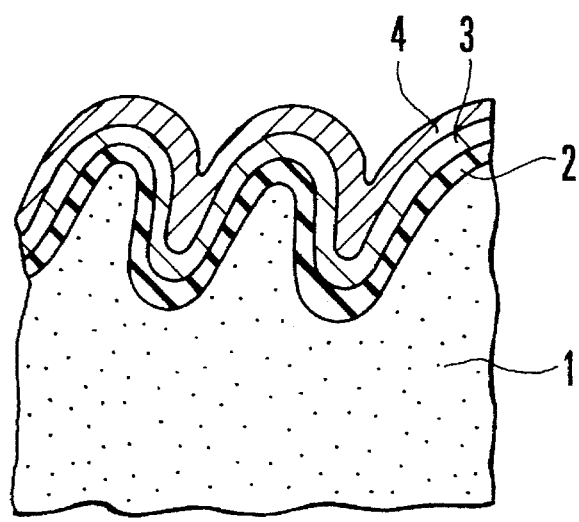

A columnar pellet (CV product value (i.e., a product of an electrostatic capacitance ($\mu$F) and an anodizing voltage (V) per gram: 23,000 /g) constituting an anode 1, having a length of 1 mm and a diameter of 1 mm, and obtained by sintering a fine tantalum powder was anodized in an aqueous 0.1 wt % nitric acid solution at 16V to form a dielectric 2 on the surface of the pellet, as shown in FIG. 2A. A total of 10 wt % of aniline and p-toluenesulfonic acid at an equi-molar ratio were mixed in a solvent mixture consisting of 70 wt % of ethanol and 30 wt % of water, thereby preparing an aniline solution.

The sintered pellet was dipped for 30 sec in this aniline solution kept at 0° C. and for 30 sec in an aqueous 0° C., 25 wt % peroxoammonium disulfide solution, and was removed therefrom. The sintered pellet was then polymerized at room temperature for 30 min. The above process was repeated twice to form black polyaniline as a first conductive polymer compound layer 3 on the dielectric 2, as shown in FIG. 2B. Pyrrole and dodecylbenzene ferric sulfonate were mixed in methanol at a ratio of 1:2 to prepare a pyrrole solution. The sintered pellet was dipped for 1 min in this pyrrole solution kept at −30° C. and removed therefrom. The sintered pellet was polymerized at room temperature for 30 min. The above process was repeated four times to obtain black polypyrrole as a second conductive polymer compound layer 4 on the first conductive polymer compound layer 3, as shown in FIG. 2C. In addition, a carbon paste and a silver paste were sequentially applied to the resultant structure and dried thereon to form a graphite layer 5 and an electrode 6, respectively. Finally, an anode lead 7 and a cathode lead 8 extended outside, and the resultant structure was molded with an epoxy resin constituting a molding resin 13, thereby obtaining a capacitor (FIG. 1A) having the sectional structure shown in FIG. 1B.

According to Example 1, after the polyaniline obtained by chemically oxidizing and polymerizing the aniline monomer is perfectly coated as a first layer on the oxide film having a very large area, the polypyrrole having a higher electrical conductivity than that of the polyaniline is then formed on the outer surface of the resultant structure in accordance with chemical oxidation and polymerization.

Example 2 will be described below. A parallelepiped pellet (CV product value: 8,300 /g) constituting an anode 1, having a length of 3 mm, a width of 2 mm, and a thickness of 1 mm, and obtained by sintering a fine tantalum powder was anodized in an aqueous 0.1 wt % nitric acid solution at 90 V to form a dielectric 2 on the surface of the sintered pellet, as shown in FIG. 2A. Pyrrole and dodecylbenzene ferric sulfonate were mixed in methanol at a ratio of 1:2 to prepare a pyrrole solution. The sintered pellet was dipped for 1 min in this pyrrole solution kept at −30° C. and removed therefrom. The sintered pellet was polymerized at room temperature for 30 min. The above process was repeated three times to obtain black polypyrrole as a first conductive polymer compound layer 3 on the dielectric 2, as shown in FIG. 2B. A total of 15 wt % of aniline and p-toluenesulfonic acid at an equi-molar ratio were mixed in a solvent mixture consisting of 70 wt % of methanol and 30 wt % of water, thereby preparing an aniline solution. The sintered pellet was dipped for 30 sec in this aniline solution kept at 0° C. and for 30 sec in an aqueous 0° C., 25 wt % peroxoammonium disulfide solution, and was removed therefrom. The sintered pellet was then polymerized at room temperature for 30 min. The above process was repeated five times to form black polyaniline as a second conductive polymer compound layer 4 on the first conductive polymer compound layer 3, as shown in FIG. 2C. A capacitor was obtained by extending the leads 7 and 8 outside, following the same procedures as in Example 1 except for the above process.

According to Example 2, after polypyrrole having a high electrical conductivity is formed as a first layer on an oxide coating, polyaniline having a high heat resistance is formed on the outer surface the resultant structure in accordance with chemical oxidation and polymerization.

Comparative Example 1 will be described below. Using a columnar pellet (CV product value: 23,000 /g) having a length of 1 mm and a diameter of 1 mm and obtained by sintering a fine tantalum powder as in Example 1, polymerization using the aniline solution and the oxidation solution as in Example 1 was repeated ten times to form a single polypyrrole layer in place of the first and second conductive polymer compound layers 3 and 4. Leads 7 and 8 extended outside, following the same procedures as in Example 1 to obtain a capacitor except for the above process.

Comparative Example 2 will be described below. Using a parallelepiped pellet having a length of 3 mm, a width of 2 mm, and a thickness of 1 mm and obtained by sintering a fine tantalum powder as in Example 2, polymerization using the pyrrole solution as in Example 2 was repeated 15 times to form a single polypyrrole layer in place of the first and second conductive polymer compound layers 3 and 4. Leads 7 and 8 extended outside, following the same procedures as in Example 2 to obtain a capacitor except for the above process.

The CV product values, the types of conductive polymer layers used in solid electrolytic capacitors, the capacitance reproduction ratios ($C/C_0$ where $C_0$ is the capacitance in the electrolytic solution), and leakage currents (LC) and resonant frequency impedances (Z) before and after a high-temperature test (150° C., 500 hours) in Examples 1 and 2 and Comparative Examples 1 and 2 are summarized in Tables 1 and 2. Table 2 also includes values before the test.

TABLE 1

| | CV Product (/g) | Conductive Polymer Compound Layer | | $C/C_0$ (%) | LC (nA) | Z (mΩ) |
|---|---|---|---|---|---|---|
| | | First Layer | Second Layer | | | |
| Example 1 | 23,000 | polyaniline | polypyrrole | 99 | 15 | 83 |
| Compartive Example 1 | 23,000 | polypyrrole | | 69 | 17 | 85 |

TABLE 2

| | CV Product (/g) | Conductive Polymer Compound Layer | | | $C/C_0$ (%) | LC (nA) | Z (mΩ) |
|---|---|---|---|---|---|---|---|
| | | First Layer | Second Layer | | | | |
| Example 2 | 8,300 | polypyrrole | polyaniline | Before Test | 93 | 57 | 76 |
| | | | | After Test | 92 | 53 | 73 |
| Comparative Example 2 | 8,300 | polypyrrole | | Before Test | 89 | 55 | 81 |
| | | | | After Test | 88 | 56 | 250 |

As can be apparent from the above results, even in a capacitor element having a very large area of a capacitor according to the present invention, the capacitance reproduction ratio is high, the impedance is small, and the frequency characteristics are excellent or both the frequency characteristics and heat resistance are excellent.

As has been described above, according to the present invention, the present invention provides a solid electrolytic capacitor having a capacitor element having a very large area in which the capacitance reproduction ratio is high and the frequency characteristics are excellent, and a method of manufacturing the same. The present invention can cope with a future measure for compactness and high packing density of electronic parts including capacitors. In addition, the present invention also provides a method of manufacturing this capacitor. Therefore, the present invention can easily cope with more strict parts mounting environments.

What is claimed is:

1. A solid electrolytic capacitor comprising:

an anode consisting of a valve metal, said anode having a lead extending therefrom;

a dielectric layer formed by oxidizing a surface of said anode;

a solid electrolyte, formed on said dielectric layer, consisting of two conductive polymer compound layers chemically oxidized and polymerized using an oxidant, said two conductive polymer compound layers comprising a polypyrrole layer formed on said dielectric layer and a polyaniline layer formed on said polypyrrole layer; and a cathode electrode on said solid electrolyte.

2. A solid electrolytic capacitor comprising:

an anode consisting of a valve metal, said anode having a lead extending therefrom;

a dielectric layer formed by oxidizing a surface of said anode;

a solid electrolyte, formed on said dielectric layer, consisting of two conductive polymer compound layers chemically oxidized and polymerized using an oxidant, said two conductive polymer compound layers comprising a polyaniline layer formed on said dielectric layer and a polypyrrole layer formed on said polyaniline layer; and a cathode electrode on said solid electrolyte.

3. A capacitor according to claim 2, further comprising an anode lead having one end fixed to said lead and the other end extending outside.

4. A capacitor according to claim 1, further comprising an anode lead having one end fixed to said lead and the other end extending outside.

5. A solid electrolytic capacitor comprising:

an anode consisting of a valve metal and having a lead extending therefrom;

a dielectric layer formed by oxidizing a surface of said anode;

two conductive polymer compound layers formed on said dielectric layer and respectively consisting of polyaniline and polypyrrole chemically oxidized and polymerized using an oxidant;

a cathode electrode formed on said two conductive polymer compound layers;

an anode lead having one end fixed to said lead and the other end extending outside; and a cathode lead having one end fixed to said cathode electrode and the other end extending outside.

6. A method of manufacturing a solid electrolytic capacitor, comprising the steps of:

oxidizing an anode consisting of a valve metal to form a dielectric layer, said anode having a lead extending therefrom;

forming a solid electrolyte on said dielectric layer, said solid electrolyte consisting of first and second conductive polymer compound layers chemically oxidized and polymerized using an oxidant, said first and second conductive polymer compound layers having a high heat resistance and a high electrical conductivity, respectively; and forming a cathode electrode on said solid electrolyte.

7. A method according to claim 6, wherein said first and second conductive polymer compound layers consist of a polyaniline layer and a polypyrrole layer, respectively.

8. A method according to claim 7, wherein the step of forming said solid electrolyte comprises a step of forming said polyaniline layer on said dielectric layer and a step of forming said polypyrrole layer on said polyaniline layer.

9. A method according to claim 7, wherein the step of forming said solid electrolyte comprises a step of forming said polypyrrole layer on said dielectric layer and a step of forming said polyaniline layer on said polypyrrole layer.

* * * * *